United States Patent Office 2,822,337
Patented Feb. 4, 1958

2,822,337

METHODS OF PRODUCING METAL OXIDE GELS

Eric Bertram Evans, Steventon, England, assignor to Esso Research and Engineering Company, a corporation of Delaware No Drawing. Application June 9, 1954
Serial No. 435,636

Claims priority, application Great Britain July 13, 1953

3 Claims. (Cl. 252—465)

This invention relates to an improved process for the preparation of metal oxide gels such as are used for contact or catalytic purposes and more particularly it refers to a process for producing such compounds whereby aniline is reacted with one or more metals to form anilides, the said anilides being hydrolysed to form a hydrous metal oxide, the aniline being regenerated and recycled.

According to the present invention there may be prepared metal oxide gels such as alumina gel, chromium oxide gel, manganese oxide gel, or compound metal gels such as zinc-aluminium gel, aluminium-magnesium, gel, aluminium-chromium gel, aluminium-manganese gel, or aluminium-molybdenum gel. To produce such gels the hydrous metal oxide which is obtained as a slurry may be dried and activated by well-known methods, or treated with impregnating solutions such as ammonium molybdate or chromic acid.

Petroleum naphtha and similar hydrocarbon mixtures containing appreciable quantities of naphthenes can be subjected to a reforming operation to yield a liquid product of improved octane number boiling within the gasoline range. Depending upon reaction conditions, catalytic reforming operations are generally referred to as either hydroforming or aromatization reactions. By hydroforming is ordinarily meant an operation conducted at elevated temperatures and pressures in the presence of a solid catalyst and added hydrogen wherein a hydrocarbon fraction is increased in aromaticity and wherein there is no net consumption of hydrogen. The term aromatization refers to an operation in which a hydrocarbon or hydrocarbon fraction is treated at elevated temperatures but at substantial atmospheric pressure in the presence of a solid catalyst for the purpose of increasing the aromaticity of the hydrocarbon or hydrocarbon fraction.

Catalytic reforming operations are usually carried out at temperatures of around 850° to 1100° F. in the presence of such catalysts as molybdenum oxide, chromium oxide and the like. These catalysts are usually supported on a base or carrier, the most commonly used base being alumina. Alumina based catalysts consisting of one or more of the group VI oxides such as molybdenum oxide or chromium oxide, supported on alumina have been prepared and used as reforming catalysts.

In addition to the reforming processes, high boiling hydrocarbon materials may be converted to low boiling hydrocarbon materials by a process of catalytic cracking carried out by subjecting the high boiling hydrocarbon material to active conditions of temperature and pressure for sufficient time in the presence of catalysts such as alumina, alumina-boria, alumina-silica, alumina-silica-magnesia, alumina-magnesia and the like. The catalyst may be in the form of fixed or moving bed with the vaporized high boiling hydrocarbon material passing therethrough or the so-called fluid technique may be used in which the catalyst material is suspended in vapours or high boiling hydrocarbon material during the reaction. Other catalytic conversions of hydrocarbons or other compounds may be practised using the catalysts prepared according to the present process.

Copending application Ser. No. 557,421, filed January 4, 1956, describes a process for the preparation of metal oxide gels used as catalysts in hydrocarbon operations described above, whereby metals are reacted with phenols or cresols, the said phenates or cresylates being subsequently hydrolysed with the formation of hydrous metal oxides, the phenol or cresol being subsequently regenerated. It is necessary in processes of this type that the regenerated compounds are freed from water before being recycled, and an advantage in the use of the present invention that the solubility of aniline in water is much less than that of phenol, and is of the same order as the solubility of cresols, is shown in Table I. This property allows much better separation of regenerated aniline and compounds, and allows greater efficiency of reaction.

TABLE I

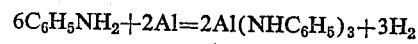

|  | Solubility in water—gms./100 mls. H$_2$O | |
| --- | --- | --- |
| Aniline | 3.4 at 20° C | 6.4 at 90° C. |
| Phenol | 6.7 at 16° C | 00 at 66° C. |
| o-cresol | 3.1 at 40° C | 5.6 at 100° C. |
| m-cresol | 2.4 at 20° C | 5.8 at 100° C. |
| p-cresol | 2.4 at 40° C | 5.3 at 100° C. |

The present invention, besides using the sparingly soluble aniline, produces products of high purity and surface area.

The preparation of metal gels may be carried out by adding the metal in any suitable form such as turnings, powder, granules or chips, to the anhydrous aniline. A reaction catalyst may also be added; suitable catalysts being mercuric chloride or other mercury salts, the amount of such reaction catalysts being preferably from 0.01 to 1% by weight based on the metal.

The reaction mixture should be heated to the boiling point of the aniline to initiate reaction, and this temperature maintained during the progress of the reaction. Using aluminium and aniline for the production of alumina gel, the reaction may be represented by the following equation:

$$6C_6H_5NH_2 + 2Al = 2Al(NHC_6H_5)_3 + 3H_2$$

The hydrogen may be removed overhead. The reaction should preferably be carried out under reflux.

The products of reaction comprising metal anilide may be hydrolysed in the reaction zone or may be passed to a suitable hydrolysis zone which may be an orifice mixer or a centrifugal pump. Hydrolysis may be carried out with water, steam or an aqueous colloidal solution such as silica hydrosol or silica hydrogel, or an impregnating aqueous solution to hydrolyse the anilide solution forming the hydrous metal salt. The temperature during hydrolysis may be between 212° F. and 400° F. The reaction at this stage may be represented by the following equation, again using the aluminium compound for the purpose of illustration:

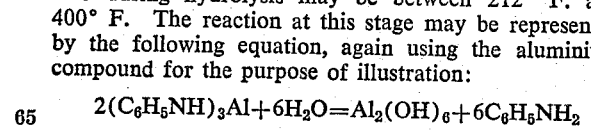

$$2(C_6H_5NH)_3Al + 6H_2O = Al_2(OH)_6 + 6C_6H_5NH_2$$

During hydrolysis with silica hydrosol or silica hydrogel, water is removed from the hydrosol or hydrogel to form the silica-metal oxide composite which can be dried. When using as an impregnating solution a solution of a metal salt such as ammonium molybdate or chromic acid, the solution is added to the slurry of metal oxide obtained from the hydrolysis reaction, and the surplus removed and the product gently dried to obtain the desired complex.

The invention therefore comprises an improved process for producing metal oxide gels, which comprises reacting one or more metals or a metal alloy with anhydrous aniline at an elevated temperature and hydrolysing the metal anilide obtained therefrom to form a hydrous metal oxide or metal oxide complex and drying the said hydrous metal oxide or metal oxide complex to form an adsorbent metal oxide gel.

The invention may be further understood by reference to the following example.

Example

Pure aluminium powder was treated with an excess of pure aniline in a three-necked flask together with 0.5% by weight of mercuric chloride as a reaction catalyst. The reaction mixture was heated to boiling point under reflux and continually stirred at that temperature for about 3 hours. On cooling, the contents of the flask were poured into a container and a quantity of distilled water added. Aniline was immediately liberated, together with a gel-like formation of aluminium hydroxide. The surplus water was removed from the gel by treatment with anhydrous alcohol, followed by ether extraction, and the resulting gel gently dried.

Similar results were obtained using manganese, using the reaction conditions described above.

What I claim is:

1. A process for producing metal oxide gels containing aluminum which comprises reacting aluminum metal with anhydrous aniline at the boiling point of aniline, hydrolyzing the reaction product to liberate aniline and to form hydrous alumina gel, recovering the liberated aniline, and drying said alumina to form an adsorbent alumina gel.

2. A process for producing metal oxide gels containing aluminum which comprises reacting aluminum metal with anhydrous aniline at the boiling point of aniline and in the presence of a small amount of a mercury compound catalyst, hydrolyzing the reaction product to liberate aniline and to form hydrous alumina, recovering the liberated aniline, and drying said hydrous alumina to form an adsorbent alumina gel.

3. A process according to claim 1 wherein an impregnating solution of ammonium molybdate is added to said alumina gel before drying.

References Cited in the file of this patent
UNITED STATES PATENTS

| 2,258,099 | Patrick | Oct. 7, 1941 |
| 2,404,024 | Bailie et al. | July 16, 1946 |
| 2,620,314 | Hoekstra | Dec. 2, 1952 |
| 2,636,865 | Kimberlin | Apr. 28, 1953 |